United States Patent [19]
Kawaguchi

[11] 3,864,804
[45] Feb. 11, 1975

[54] CLIP FASTENING DEVICE

[75] Inventor: Isao Kawaguchi, Hiroshima-ken, Japan

[73] Assignee: NHK Spring Co., Ltd., Isogo-ku, Yokohama-shi, Japan

[22] Filed: Feb. 27, 1974

[21] Appl. No.: 446,277

[52] U.S. Cl.......... 29/211 M, 29/212 D, 29/243.56, 140/93 D
[51] Int. Cl........................... B23q 7/10, B23p 11/00
[58] Field of Search ..... 29/203 D, 212 D, 203 MW, 29/203 R, 252, 212 R, 211 M, 243.56; 140/93 D

[56] References Cited
UNITED STATES PATENTS

| | | | |
|---|---|---|---|
| 2,929,069 | 3/1960 | Christin | 29/212 D |
| 2,969,545 | 1/1961 | Allen | 29/212 D |
| 3,391,440 | 7/1968 | Harms | 29/203 D |

*Primary Examiner*—Thomas H. Eager
*Attorney, Agent, or Firm*—Flynn & Frishauf

[57] ABSTRACT

A clip fastening device is adapted to sandwich a clip between upper and lower jaws and then deform the clip into a fastening engagement with a workpiece, for example, a pair of wires. The upper jaw is reciprocably moved up and down by an air cylinder mechanism. The upper jaw is lowered from its uppermost position as a first step to a clip holding position and then as a second step to a clip fastening position where the clip is deformed into a fastening engagement with the workpiece. During the lowering movement of the upper jaw a compression spring within an air cylinder mechanism is urged. Clips are reliably fed one by one from a substantially uprightly arranged clip case toward a clip feeding outlet, by means of an actuating lever, stopper pin etc., in association with the reciprocatory up and down movement of the upper jaw.

8 Claims, 6 Drawing Figures

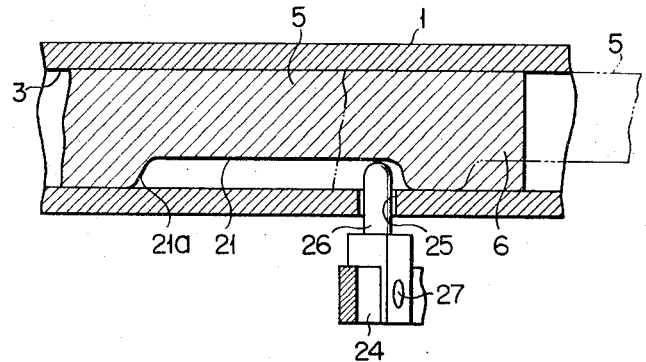
FIG. 2
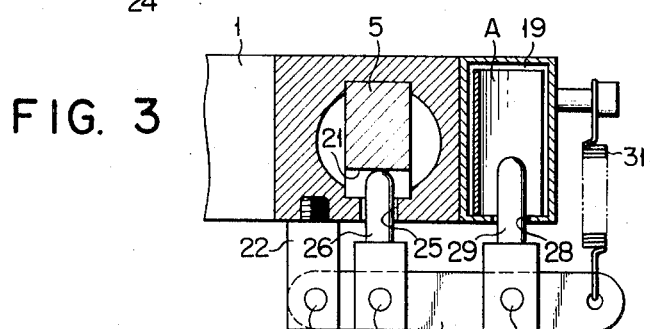
FIG. 3
FIG. 4
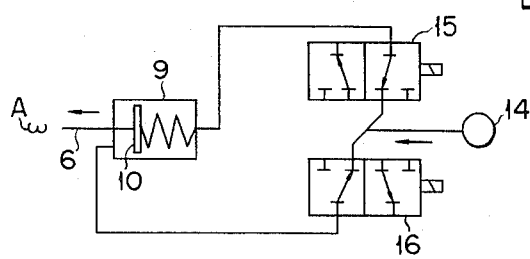
FIG. 5
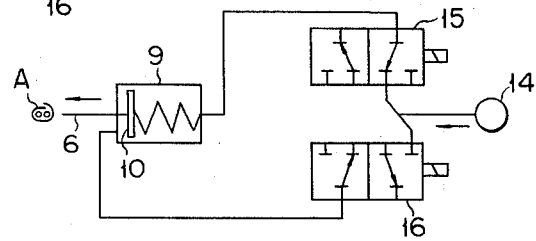
FIG. 6
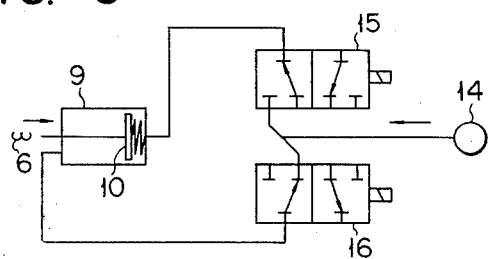

CLIP FASTENING DEVICE

This invention relates to a clip fastening device primarily for use in fastening together a pair of wires with, for example, an E-shaped clip.

When a seat or the like is assembled, a pair of frame wires for the seat, or a frame wire and a cushion spring wire, are fastened together with, for example, an E-shaped clip. It is known in this case to use a hand-operable clip fastening device.

With a conventional clip fastening device, a clip is held, only under an attraction force of a magnet, within the clip fastening device and a fastening operation is carried out by engaging a pair of wires with the clip held in this fashion. However, the clip tends to be dropped or displaced in its position or direction in spite of the attraction force of the magnet and a clip fastening operation is frequently interrupted due to an improper or insufficient fastening engagement of the clip with the workpiece, thus resulting in reduced efficiency.

Furthermore, a clip case having a plurality of clips loaded therein is mounted in a sideward direction and the clip is forcefully fed into a clip holding position during a fastening operation. With such a construction, since no mechanism is provided for preventing the egress of the next successive clip until a predecessor clip completes its fastening engagement with the workpiece, jamming sometimes occurs in the neighborhood of a clip feeding outlet and a clip fastening operation is also interrupted.

With the conventional clip fastening device, when a jaw for clip fastening is driven a compression spring disposed within one of two cylinder chambers, which are separated by a piston, functions as a return spring for returning the jaw to an original position. With such a structure, however, since the jaw must be moved to an operative position against the compression spring, insufficient speed is obtained and a particular force adding device is therefore necessary. This involves a complicated structure and a high manufacturing cost.

SUMMARY OF THE INVENTION

It is accordingly the general object of this invention to provide a clip fastening device free from various drawbacks as encountered in the above-mentioned conventional clip fastening device. With a clip fastening device according to this invention, an upper jaw substantially serves as means for holding a clip in a clip holding position. That is, the upper jaw is lowered from its uppermost position as a first step to the clip holding position where a clip is held, between the upper and lower jaws, to the extent that it is not deformed. A magnet is provided near the clip holding position and serves primarily the double purpose of delaying the dropping speed of the clip and controlling the posture of the clip.

Furthermore, a clip case having a plurality of clips loaded therein is disposed in a substantially upright direction to permit the loaded clips to be fed toward a clip feeding outlet under a gravitational force. In an attempt to reliably feed the loaded clips, one by one, toward the clip feeding outlet in association with the reciprocatory up and down movement of the upper jaw, there is provided a clip drop control mechanism for stopping and releasing the clip in association with the reciprocatory movement of the upper jaw.

As a driving means for effecting an up and down movement of the upper jaw, there is provided a rapidly operable air cylinder mechanism in which a compression spring for adding a force at the down stroke of the piston is provided. This obviates the necessity of providing any particular force adding mechanism, resulting in a simple construction and low manufacturing cost.

A primary object of this invention is to provide a clip fastening device capable of reliably holding a clip in correct position without involving any unwarranted drop or displacement in position or direction of the clip and without providing any improper or insufficient fastening engagement with a workpiece.

A secondary object of this invention is to provide a clip fastening device capable of reliably feeding clips, one by one, to a clip holding position without involving jamming in the neighborhood of a clip feeding outlet.

A third object of this invention is to provide a clip fastening device capable of effecting a fastening operation at rapid speed and with improved efficiency.

A fourth object of this invention is to provide a clip fastening device simple in construction and low in a manufacturing cost.

BRIEF DESCRIPTION OF THE DRAWINGS

FIG. 2 is a cross-sectional view taken along line 2—2 of FIG. 1;

FIG. 3 is a cross-sectional view taken along line 3—3 of FIG. 1; and

FIGS. 4-6 are circuit diagrams for explaining the operative states of solenoid valves for drivingly controlling an air cylinder mechanism.

DETAILED DESCRIPTION

Figure 1:
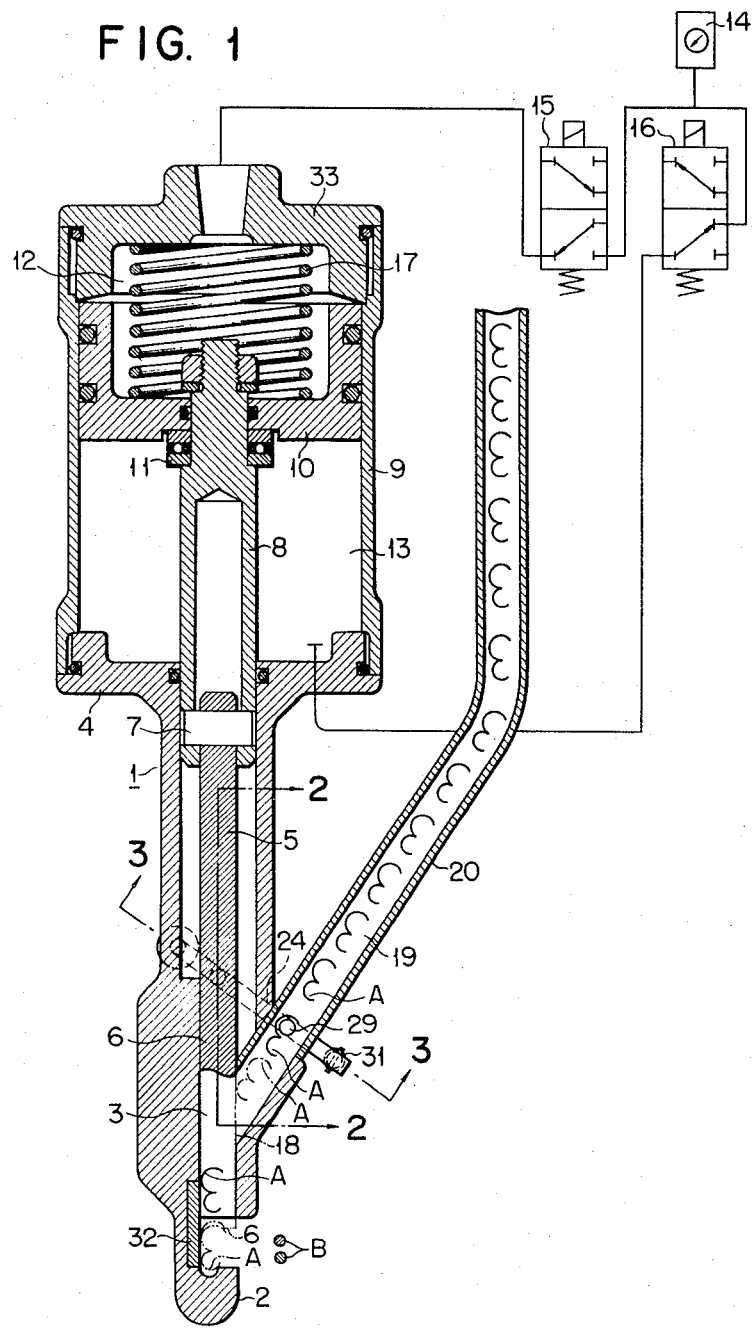
FIG. 1 is a longitudinal cross-sectional view of a clip fastening device according to this invention.

A clip fastening device shown in FIG. 1 is provided with a device body 1 which is arranged in an upright direction. The device body has a lower jaw 2 provided at its lower end. Above the jaw 2 a guide passage 3 extends in an upward direction. At the upper end of the device body 1 a flange 4 is integrally provided. An operating rod 5 rectangular in cross section is vertically movable within the guide passage 3. The lower end of the operating rod 5 constitutes an upper jaw 6 which oppositely faces the lower jaw 2. A clip A shown in a double dot chain line is guided onto the lower jaw 2 and then deformed between the upper jaw 6 and the lower jaw 2. Though the clip A is E-shaped, other types may be used instead.

A recess corresponding in shape to the clip A is provided in the respective engaging surfaces of the upper and lower jaws 6, 2.

The upper end portion of the operating rod 5 is connected through a connecting pin 7 to the lower end portion of the piston rod 8. The upper end portion of the piston rod 8 is connected through a thrust bearing 11 to a piston 10 adapted to be slidably moved up and down within an air cylinder 9. The flange 4 of the device body 1 is mounted to the air cylinder 9 in an airtight fashion. The piston 10 divides the interior of the cylinder 9 into upper and lower cylinder chambers 12 and 13. Both cylinder chambers 12 and 13 can be connected selectively to a compressor 14 of a common air pressure source through solenoid valves 15 and 16 which are conventional 3-port valves. In a situation where no clip fastening operation is effected as shown in FIG. 1, the upper cylinder chamber 12 is open to the atmosphere as will be evident from the states of the solenoid valves 15 and 16 shown in the Figure and pressure is applied from the compressor 14 to the lower cylinder chamber 13.

Within the upper cylinder chamber 12, a compression spring 17 is disposed in a compressed state. The compression spring 17 urges the piston 10 normally in an upward direction. A cover member 33 is fitted, in an airtight fashion, into the upper end portion of the cylinder 9 so that the annular lower end surface of the cover member 33 is abutted against the annular upper end surface of the piston 10. The lower end surface of the cover member 33 is tapered as shown in the Figure. Consequently, the operation area of a pressure acting on the upper surface of the piston 10 within the upper cylinder chamber 12, when compared with the operation area of a pressure acting on the lower surface of the piston 10 within the lower cylinder chamber 13, is greater than the latter operation area by an amount corresponding to the cross-sectional area of the piston rod 8. From this it follows that when a pressure of the same level is applied from the compressor 14 to both the upper and lower cylinders 12 and 13 a force corresponding to a sum of a downward urging force of the compression spring 17 and a product obtained through the multiplication of the cross-sectional area of the piston rod 8 by the air pressure of the compressor 14 is applied downward. With such an air cylinder mechanism, the operating rod 5 and thus the upper jaw 6 are driven in the up and down directions.

The upper jaw 6 is normally in its uppermost position as shown in a solid line in FIG. 1. A clip feeding outlet 18 is opened toward the guide passage 3. A cylindrical clip case 20 is mounted at its lower end to the clip feeding outlet 18. Within the clip case 20 is provided a clip feeding passage 19 where, for example, E-shaped clips are loaded in a sequential fashion. Since the clip case 20 is disposed substantially in an upright direction, the clip tends to be fed down toward the clip feeding outlet 18 under the influence of a gravitational force.

As well shown in FIG. 2, a longitudinal groove 21 is formed along one longitudinal side surface of the rectangularly shaped operating rod 5. On one side of the device body 1 is secured a support bracket 22 which is in a certain positional relation with the longitudinal groove 21. The base end of an actuating lever 24 is pivotally mounted through a pivot 23 to the support bracket 22. The opposite end of the actuating lever 24 extends toward the clip case 20 as shown in FIGS. 1 and 3. Midway of the actuating lever 24, an actuating pin 26 whose forward end extends through a through bore 25 of the device body 1 into the longitudinal groove 21 has its base end mounted by means of a pivot 27 to the actuating lever 24. In another position midway of the actuating lever 24, a clip stopper pin 29 whose forward end extends through a through bore 28 of a clip case 20 into the clip feeding passage 19 has its base end mounted by means of a pivot 30 to the actuating lever 24.

A tension spring 31 is disposed between the forward end portion of the actuating lever 24 and the clip case 20. The actuating lever 24 is constantly urged toward the device body 1 and the clip case 20. The actuating lever 24 is held against the force of the spring 31 in such a manner that the forward end of the actuating pin 26 is abutted against the surface of the longitudinal groove 21 of the operating rod 5 as shown in FIG. 2. When the actuating lever 24 is in an original position as shown in FIG. 3, the clip stopper pin 29 is engaged, as shown in FIG. 1, with a lowermost one A of the clip successively loaded within the clip feeding passage 19 and prevents a drop of the bottommost clip toward the clip feeding outlet 18. That is, the clip stopper pin 29, actuating lever 24, actuating pin 26, longitudinal groove 21 etc., together, constitute a control mechanism for controlling a drop of the clip A.

The length and position of the longitudinal groove 21 is so set that the following relation is established. That is, when the operating rod 5 is lowered from its uppermost position shown in a solid line in FIG. 1 to a clip holding position shown in a double-dot dash line in FIG. 1, the longitudinal groove 21 of the operating rod 5 is moved to cause the actuating pin 26 to be pushed outward by the side surface of the operating rod 5. The pushing movement of the actuating pin 26 is very effectively effected, since a cam surface 21a provided at one end of the longitudinal groove 21 performs its camming function.

In a position slightly below that surface of the guide passage 3 which oppositely faces the clip feeding outlet 18 is embedded a magnet 32 for attracting the clip A.

There will now be explained the operation of fastening the clip A to a workpiece B (a pair of wires) located in the neighborhood of a clip holding position, as shown in FIG. 1, using the clip fastening device.

When the 3-port solenoid valves 15 and 16 are in the state shown in FIG. 1 the air pressure of the compressor 14 is applied only to the lower cylinder chamber 13 and the upper jaw 6 is in its uppermost position as already set forth above. In this state, one clip is dropped down into the guide passage 3 and attracted by the magnet 32 in a position shown in a solid line in FIG. 1.

When the solenoid valves are in the state shown in FIG. 4, air pressure of the same level is applied to the upper and lower cylinder chambers 12 and 13. Consequently, a force corresponding to a sum of a force of the spring 17 and a product obtained through the multiplication of the cross-sectional area of the piston rod 8 by the air pressure is applied to the piston 10. This causes the operating rod 5 to be lowered as a first step to the clip holding position as shown in the double-dot dash line in FIG. 1. During this movement the upper jaw 6 is engaged with the clip A and is lowered to the clip holding position, with the clip A kept engaged with the upper jaw 6, where the upper and lower jaws cooperate to hold the clip A in correct position as shown in a double-dot dash line in FIG. 1. The above-mentioned sum force applied to the piston 10 is designed to have such a magnitude that the clip A is slightly depressed to the extent that it retains its original shape.

In the clip holding position, the clip case 20 is manually gripped and the clip A is brought into engagement with a pair of wires B to be fastened together. This engagement may be effected by either moving the clip fastening device relative to the pair of wires B or moving the pair of wires B relative to the clip fastening device.

When a foot switch is turned ON, an electric circuit is energized to bring the solenoid valves 15 and 16 into a state shown in FIG. 5. Consequently, the air pressure within the lower cylinder chamber 13 is opened to the atmosphere and an air pressure from the compressor 14 is applied only to the upper cylinder chamber 12 so that the piston 10 is depressed downward by a force corresponding to a sum of a force of the spring 17 and the air pressure applied to the upper surface of the piston 10. As a second step, the upper jaw 6 is further lowered, strongly and at an abrupt speed, from the clip holding position down to a clip fastening position. As a result, the clip A is deformed into a fastening engagement with the pair of wires B so that they are connected together in a pair. Thus, a clip fastening operation is completed. If upon completion the foot switch is turned OFF, then the solenoid valves 15 and 16 are caused to be switched over to the state as shown in FIG. 1 to permit the upper jaw 6 to be returned to the initial position.

When the upper jaw 6 is lowered as a first step from its uppermost position down to the clip fastening position, the actuating pin 26 whose forward end is inserted into the longitudinal groove 21 is pushed outward, as mentioned above, by the side surface of the operating rod 5 to cause the actuating lever 24 to be swung, against the force of the spring 31, in a clockwise direction in FIG. 3 with the pivot 23 as a center to permit the clip stopper pin 29 to be withdrawn from the clip feeding passage 19. For this reason, the bottommost clip A held by the stopper pin 29 is dropped toward the clip feeding outlet 18 under a gravitational force. At this time, the clip feeding outlet 18 is already blocked by the operating rod 5 and, therefore, the dropped clip A is stopped in a manner to be abutted against the side surface of the operating rod 5. Simultaneously with the drop of the clip A, the next successive clip A is dropped, under a gravitational force, into the position vacated by the predecessor clip A so that it corresponds to the clip stopper pin 29.

The length of the longitudinal groove 21 may be so determined that when the upper jaw 6 is lowered from the clip holding position, as a second step down to the clip fastening position the clip stopper pin 29 is disengaged from the clip A.

After completion of the clip fastening operation, when the upper jaw 6 is returned to its uppermost position, the clip feeding outlet 18 is unblocked and the clip A now abutted against the side surface of the operating rod 5 is dropped down into the guide passage 3. At the same time or immediately therebefore, the next successive clip A is stopped by the stopper pin 29. This is due to the fact that as the operating rod 5 is returned to the original position the actuating pin 26 is engaged with the longitudinal groove 21 of the operating rod 5 and, as a result, the actuating lever 24 is again swung, under the influence of the spring 31, into the position shown in FIG. 3.

The clip A dropped down into the guide passage 3 is attracted by the magnet 32 in the position shown in a solid line in FIG. 1. In the actual operative state, the time required for the upper jaw 6 to be lowered after it is returned to its uppermost position is very brief, since the switching time of the solenoid valves 15 and 16 is controlled by a timer, not shown, to be about 0.2 second. Consequently, the moment the clip A is dropped down into the guide passage 3 and attracted to the magnet 32 the upper jaw 6 is already lowered and is about to be engaged with the clip A. That is, the magnet 32 exists for the double purpose of somewhat slowing down the drop speed of the clip A and maintaining the clip A in a correct dropping posture, rather than for the purpose of attractively and reliably holding the clip A.

As mentioned above, the upper jaw 6 is reciprocably moved within the guide passage 3 by the air cylinder mechanism driven under the control of the two solenoid valves 15 and 16. For each reciprocatory movement of the operating rod 5 clips A are sequentially and reliably fed, one by one, from the clip case 20 into the guide passage 3 and the fed clip A is reliably held in position between the upper jaw 6 and lower jaw 2. Consequently, no failure occurs during the clip fastening operation.

Though an upper end of the clip case 20 is shown broken away in FIG. 1, in an actual practice a magazine, not shown, having a plurality of clips received therein is detachably mounted to the upper end of the clip case 20. The lower jaw 2 may be provided separately from the device body 1 and, in this case, the separate lower jaw is secured to the device body.

What is claimed is:

1. A clip fastening device comprising, in combination,
   a. a device body arranged in an upright direction and including a guide passage provided in its longitudinal direction and a clip feeding outlet open at one side surface of the guide passage;
   b. an operating rod slidably mounted within the guide passage of the device and having an upper jaw;
   c. a lower jaw provided at the lower end of the device body so as to oppositely face the upper jaw;
   d. an air cylinder mechanism mounted at the upper end of the device body to cause the operative rod to be reciprocably moved up and down;
   e. an air pressure supply source for supplying air pressure to the air cylinder mechanism;
   f. control means for controlling the supply of the air pressure from the supply source to the air cylinder mechanism;
   g. a clip case disposed in a substantially upright direction and having its lower end mounted to the clip feeding outlet, said clip case having loaded therein a plurality of clips tending to be sequentially dropped through the clip feeding outlet into the guide passage under a gravitational force; and
   h. a clip drop control mechanism adapted to be normally engaged with a bottommost clip within the clip case so as to prevent a drop of the loaded clips down into the guide passage and adapted to be disengaged from the bottommost clip in association with the up and down movement of the operating rod so that the loaded clips are intermittently dropped one by one for each reciprocatory movement of the operating rod.

2. A clip fastening device according to claim 1 in which said air cylinder mechanism comprises an air cylinder, a piston disposed within the air cylinder to divide the interior of the air cylinder into upper and lower cylinder chambers into which an air pressure of the same level is selectively supplied, a piston rod having its lower end connected to the operating rod and its upper end connected to the piston, and a compression spring provided within the upper cylinder chamber to constantly urge the piston in a downward direction; and in which the air pressure of the same level is applied from an air pressure supply source through the control means into the upper and lower cylinder chambers; whereby when the air pressure is applied only to the lower cylinder chamber the upper jaw is in its uppermost position, when the air pressure is applied to both the upper and lower cylinder chambers the upper jaw is lowered from its uppermost position as a first step to a clip holding position where the clip is sandwiched between the upper and lower jaws to the extent that it is not deformed, and when the upper jaw is further lowered from the clip holding position down to a clip fastening position, the clip is deformed into a fastening engagement with a workpiece.

3. A clip fastening device according to claim 2 in which the lower surface of said upper jaw and the upper surface of said lower jaw correspond in shape to the clip.

4. A clip fastening device according to claim 2 in which the pressure operating area of said lower cylinder chamber is smaller than that of said upper cylinder chamber by an amount corresponding to the cross-sectional area of the piston rod and wherein a force applied to the piston when the upper jaw is lowered from its uppermost position to the clip fastening position is a force corresponding to a sum of a force of the compression spring and a product obtained through the multiplication of the cross-sectional area of the piston rod by the air pressure.

5. A clip fastening device according to claim 2 in which said control means comprises two tri-directional solenoid valves connected respectively to the upper and lower cylinder chambers.

6. A clip fastening device according to claim 1 in which said clip drop control mechanism comprises an actuating lever swingably mounted to the device body and biased normally in one direction, a clip stopper pin mounted on the actuating lever and extending through a through bore of the clip case into the interior of the clip case to cause the stopper pin to be engaged with the bottommost clip of the loaded clips to prevent a drop of the bottommost clip, means adapted to control the swinging movement of the actuating lever in such a manner that, when the upper jaw is lowered to block the clip feeding outlet, the actuating lever is swung in one direction to cause the clip stopper pin to be disengaged from the bottommost clip to permit the latter to be dropped toward the clip feeding outlet, and when the upper jaw is raised to its uppermost position the actuating lever is swung into the original position to permit the clip stopper pin to be engaged with the next successive clip.

7. A clip fastening device according to claim 6 in which said last-mentioned control means comprises a longitudinal groove provided in one side surface of the operating rod and along the longitudinal direction of the operating rod, an actuating pin provided on the actuating lever in a manner to extend through a through bore of the device body into the longitudinal groove, and a cam surface provided at one end of the longitudinal groove and adapted to be engaged, during the operation of the operating rod, with the actuating pin normally projecting into the longitudinal groove to cause the actuating pin to be pushed outward from the longitudinal groove.

8. A clip fastening device according to claim 7 in which a magnet for attracting the clip is embedded in a position slightly below that surface of the guide passage which oppositely faces the clip feeding outlet.

* * * * *